United States Patent [19]

Beasley

[11] 4,239,543
[45] Dec. 16, 1980

[54] NON-CRUSTING JET INK AND METHOD OF MAKING SAME

[75] Inventor: J. Donald Beasley, Arlington Heights, Ill.

[73] Assignee: Gould Inc., Rolling Meadows, Ill.

[21] Appl. No.: 11,003

[22] Filed: Feb. 9, 1979

Related U.S. Application Data

[63] Continuation-in-part of Ser. No. 833,786, Sep. 16, 1977, abandoned.

[51] Int. Cl.$^3$ ............................................. C09D 11/02
[52] U.S. Cl. ..................................................... 106/22
[58] Field of Search .......................................... 106/22

[56] References Cited

U.S. PATENT DOCUMENTS

| | | | |
|---|---|---|---|
| 3,846,141 | 11/1974 | Ostergren et al. | 106/22 |
| 3,870,528 | 3/1975 | Edds et al. | 106/22 |
| 4,101,329 | 7/1978 | Loock | 106/22 |
| 4,163,675 | 8/1979 | Hirano et al. | 106/22 |

FOREIGN PATENT DOCUMENTS 2622352 12/1976 Fed. Rep. of Germany.

*Primary Examiner*—Earl A. Nielsen
*Attorney, Agent, or Firm*—John D. Foster; Russell E. Baumann; Edward E. Sachs

[57] ABSTRACT

An ink composition, suitable for use in jet printing, comprises a dye in a solvent consisting of water and lower alkylene glycol which is highly soluble in both water and the lower alkylene glycol, which is chemically stable for long periods in the solvent, has high tinctorial power and is resistant to fading by light. The ink composition is characterized by its ability to reduce the evolution of gases from solution at reduced pressure. The ink composition is further characterized by an adjusted pH of about 3 to about 6. In addition, the ink composition may contain preservatives to prevent fungus and bacteria growth.

18 Claims, No Drawings

NON-CRUSTING JET INK AND METHOD OF MAKING SAME

RELATED APPLICATIONS

This application is a continuation-in-part of application Ser. No. 833,786, filed 9/16/77, now abandoned entitled Non-Crusting Jet Ink Composition and Method of Making Same, and now abandoned.

BACKGROUND OF THE INVENTION

1. Field of the Invention

This invention relates to a printing ink composition, and, more particularly, to a printing ink composition suitable for use either in a jet printing apparatus wherein the ink jet assemblies are connected to a pressurized ink source, or in a jet printing apparatus wherein the ink jet assemblies are connected to an ink source under small positive, small negative or zero static pressure, such as in, for example, an ink jet printer of the type disclosed in U.S. Pat. No. 3,683,212.

In early developments in the ink jet printing art the basic imaging technique involved the use of one or more ink jet assemblies connected to a pressurized source of ink. In later developments, however, for example in U.S. Pat. No. 3,683,212 to Zoltan, the ink source is under small negative or zero static pressure. The ink from the ink source is drawn into the ink jet by the capillary action of the ink. Each ink jet has a very small orifice, typically on the order of 0.003 inch. Uniform droplets of ink may be electrostatically charged as they exit from the jet, to be controllably directed onto the recording medium to form alphanumeric characters in response to an electrostatic deflection system.

In the early work relating to ink jet printing, drafting pen inks and fountain pen inks were used. However, these inks were unsuitable for use in jet printing because the solid particles in the dyes of these inks would clog the small orifice of the ink jet. Also, these inks had a tendency to "tip-dry" when left in the ink jet while the ink jet was not in use, e.g., during shutdown periods overnight or for more extended periods when the equipment was not being used. The ink would dry out and form a crust or skin in the orifice of the jet. Upon resumed operation the crust or skin would either prevent ink flow altogether or it would deflect the individual ink droplets emitted from the orifice in an uncontrolled and hence undesirable manner.

It has also been found that the evolution of gases from the ink during the operation of an impulse ink jet printer having an ink source under small positive, small negative or zero static pressure is undesirable. Such gassing inhibits the performance of the printer by interferring uncontrollably with the hydraulic pressure cycle involved in ejecting the stream of ink droplets emitted from the ink jet orifice, and poor printing quality results.

In jet printers generally, and, in particular, in standing impulse jet printers a permeable hose is often utilized as the conduit through which the ink is fed from the ink supply source to the ink jet. The permeable hose is an acoustic dampener which permits better frequency response of the ink so that a single droplet of ink is emitted from the jet tip for each electrical pulse applied to the jet. It has been found that the evaporation of water to the atmosphere of ink compositions comprising a dye in a solvent consisting of a humectant or heavy glycol thinned with water to lower the viscosity to the desired 1 to 10 cps, causes the viscosity of the composition to increase, which, in turn, inhibits or prevents, the desired operation of the printer.

Accordingly, it is an object of the present invention to provide a new and improved printing ink suitable for use in ink printers which substantially reduces or obviates the evolution of gases from the ink composition during operation of the ink jet printer.

It is a further object of the present invention to provide a new and improved printing ink suitable for use in ink jet printing which does not dry out and encrust or skin the jet orifice during the shut down periods of a jet printer.

Yet another object of the invention provides an ink composition which has a stable viscosity when exposed to ambient humidity.

It is yet another object of the present invention to provide a new and improved printing ink suitable for use in ink jet printing which is stable over a long shelf life.

It is still another object of the invention to provide a method for making the new and improved ink composition.

Other objects and advantages of the present invention will be apparent based on the following detailed description of the invention.

DESCRIPTION OF THE PRIOR ART

The prior art has focused on various ink compositions which have been developed to minimize or prevent encrustation or skinning over the ink jet orifice of an ink jet printer during shutdown periods. However, the prior art has not confronted specifically the problem of gassing in the ink supply line of an ink jet printer wherein the ink supply source is at low or zero static pressure. For example, it is known that the addition of a dye to a humectant dissolved in water will result in an ink composition suitable for use in ink jet printing characterized by its ability to obviate or at least minimize ink jet encrustation.

U.S. Pat. No. 3,705,043 to Zabiak describes an ink composition suitable for use in jet printing, said composition being capable of producing an image having high infrared absorption characteristics, said composition being comprised of carbon black, a dye, solubilized in water, selected from the group consisting of water soluble nigrosine dyes and spirit soluble nigrosine dyes, 5–30% by weight of a humectant selected from the group consisting of alkylene glycols and alkyl ether of alkylene glycols in which the alkylene group contains 2–6 carbon atoms and the alkyl group contains 1–6 carbon atoms, and 94 to 30% by weight water, said composition having a viscosity of 1 to 10 cps. at 25° C.

U.S. Pat. No. 3,846,141 to Ostergren and Zabiak describes an ink composition for use in ink jet printing processes which substantially eliminates tip-dry (jet orifice encrustation) while maintaining the desired viscosity. The ink, which has a viscosity of 1.0 to 10 cps. at 25° C. is an aqueous solution of 0.5 to 7.0% by weight of a water soluble direct dye such as Direct Black GW and 5 to 40% by weight of a humectant system formed of a mixture of a lower alkoxy triglycol and at least one compound selected from the group consisting of a polyethylene glycol, polypropylene glycol, a lower alkyl ether of ethylene glycol and diethlylene glycol, propylene glycol and glycerol. This reference also teaches the addition of 6-acetoxy-2,4 dimethyl-m-dioxane, a preservative, to inhibit bacteria growth.

Similarly, U.S. Pat. No. 3,870,528 to Edds describes an ink composition for use in a jet printing apparatus comprised of a mixture of dyes (one of which may be water soluble nigrosine), polyethylene glycol, a fungicide or anti-bacterial agent, a dye solvent, and water.

German patent 26 22 352 discloses a jet printing ink composition comprising 2 to 12% (by weight) of a water soluble colorant, 35 to 80% of a lower alkyl glycol having 2 to 6 carbon atoms and water. The use of a variety of black or blue water soluble colorants, including nigrosine, Acid Black 2, is disclosed. Suitable lower alkyl glycols include ethylene glycol and propylene glycol, the amount of glycol employed being dependent upon the desired viscosity of the final ink composition. Furthermore a preservative may be added to the composition to inhibit bacteria growth.

SUMMARY OF THE INVENTION

According to the invention an ink composition having improved, that is reduced, tip-dry characteristics, improved anti-gassing characteristics in the supply source and supply line of an ink jet printer wherein said source and said line are under small positive, small negative or zero static pressure, improved stability over a long shelf life, and which has a viscosity that does not exceed the maximum operable limit of the printer when the ink composition is exposed to ambient humidity is provided. A dye is dissolved in a water/lower alkylene glycol mixture (said gylcol sometimes hereinafter referred to as viscosity-increaser) to form an ink composition whose pH is adjusted by addition of an acid or buffer solution, as necessary, to be in the range of 3 to 6. The dye is highly soluble in both water and the lower alkylene glycol; it is chemically stable for long periods, e.g., periods longer than one month in the water/lower alkylene glycol mixture, it has high tinctorial power; and it is resistant to fading by light. A preservative may be added to the ink composition to inhibit fungus and bacteria growth in the ink.

DETAILED DESCRIPTION OF THE INVENTION

The present invention is predicated on the discovery that by the proper selection and combining of (1) a viscosity-increaser, (2) a coloring material, that is, a dye which is highly soluble in both water and the viscosity-increaser; is chemically stable for long periods in the water/viscosity-increaser mixture; has high tinctorial power; and is resistant to fading by light, (3) water, and (4) an acid or buffer solution, if necessary to adjust the pH of the mixture to be in the range 3 to 6, a non-crusting ink composition characterized by its ability to at least reduce the of gases from solution at reduced pressure, compared to the solvent system alone, and further characterized by a viscosity which is stable when the ink is exposed to ambient humidity, may be readily prepared. The ink composition is prepared at ambient conditions according to the steps of (1) mixing the coloring material in the viscosity increaser until dissolved, preferably for about 45 minutes, (2) filtering the coloring material/viscosity increaser solution of (1), preferably over a vacuum of about 10 mm Hg for about one hour to remove undissolved residues, (3) adding to the filtered coloring material/viscosity increaser of (2) sufficient viscosity increaser to replace the viscosity increaser lost during filtration, to make the mass of the filtered coloring material/viscosity increaser solution equal to the mass of the starting coloring material/viscosity increaser mixture, to facilitate the manufacture of reproducible ink compositions, (4) adding water to the solution of (3) and stirring for a period of time sufficient to obtain a homogeneous solution, preferably 15 to 30 minutes, (5) adding to the solution of (4) activated charcoal, preferably about 10% by weight of the ink composition, and stirring to remove from the solution any reactive components of the dye, thereby enhancing the stability of the ink composition, (6) filtering the solution of (4) to remove the activated charcoal from the solution, (7) passing the liquid through a filter, preferably having a pore size of 1 micron or less, to clear the ink and to prevent agglomeration of particles remaining in solution, and (8) adding sufficient acid, if necessary, to adjust the pH of the mixture to value of from 3 to 6 enhance the self-cleaning characteristics of the ink. A preservative is preferably added to the ink composition to inhibit fungus and bacteria growth therein. The preservative may be added during any step in the procedure.

While it is generally known that activated charcoal may be used as a cleaning agent to remove impurities from chemical compositions, it has been found that ink compositions treated with activated charcoal are more stable than ink compositions which were not so treated. Accordingly, the shelf-life of the ink compositions of the present invention are substantially greater than the shelf-life of ink compositions that were not treated with activated charcoal.

It has been found that the ink compositions made in accordance with this invention have the desired viscosity suitable for use in jet printing; that their viscosity is stable even when the ink composition is exposed to ambient humidity; that they do not skin over at the ink jet orifice; that they do not encrust the jet orifice when the printer remains idle for a long period of time; and that there is reduced gassing in the ink supply line, particularly in an ink jet printer wherein the ink is under small positive, small negative or zero static pressure. Carrying out the same manipulative steps as set forth above, but with heating of the mixture to enchance dissolution of the dye will yield a useful ink composition. However, the ink prepared with heating may not be as effective as the same composition prepared at ambient conditions in "self-cleaning" as hereinafter discussed.

All parts referred to hereinafter are parts by weight based on 100 parts by weight of the total ink composition unless otherwise noted.

According to the invention, a water miscible organic solvent, hereinafter, viscosity increaser, is mixed with water, preferably deionized or distilled, to form a mixture having a viscosity suitable for use in a jet printer. To permit the formation of a single droplet of ink per electrical pulse applied to the jet and to permit the formation of substantially uniform droplets, the viscosity increaser used to formulate the ink composition in accordance with the practice of the present invention should not increase the viscosity of the composition beyond the range of 2 to 20 cps at 25° C. Furthermore, the viscosity increaser and water should form a stable solution so that upon exposure of the ink composition to ambient humidity, the viscosity of the ink will not rise above the upper operable limit of the printer. It should be noted that in all cases, the viscosity chosen for a particular formulation is dependent upon the temperature at which the ink is to be used in the ject printing operation. In accordance with the invention, the preferred viscosity increaser is a lower alkylene glycol selected from the group consisting of ethylene glycol and propylene glycol, present in the composition in an amount of from about 20 to about 97, and more preferably 50 to 97, parts by weight. For an ink composition that will remain fluid in the jet tip for an extended period, for example up to six months, the viscosity increaser is preferably ethylene glycol, present in an amount of between 50% and 90% by weight of the total ink composition, with 83% by weight being the most preferred. Ink compositions with the higher concentrations of the glycol, that is, 50% by weight and higher, tend to form more stable solutions when exposed to ambient humidity.

In a preferred embodiment of the invention the surface tension of the ink composition is from about 25 to about 55 dynes/cm so that there will be sufficiently rapid refill of the jet between droplet ejections.

To minimize any encrustation of the jet orifice due to precipitation of the mineral salts naturally present in water, the use of deionized or distilled water in the ink composition is preferred. The water should be present in amounts from about 2 to about 80 parts by weight.

Coloring materials or dyes, suitable for use in the ink composition of the present invention are dyes which are highly soluble in both water and the viscosity increaser, so that the dye does not precipitate from the composition if some of the solvent evaporates; dyes which are chemically stable over long periods, such as for example, longer than one month so that the dye or chemical derivatives thereof do not form scum, agglomerates, or precipitates, or change color, during the periods the printer is not in use; dyes which have high tinctorial power so that the use of a relatively small amount of dye results in a strong color on the coloring material; and dyes which are resistant to fading by light so that the color intensity of the ink on the printed material remains unchanged for useful periods of time, such as on the order of five years.

Dyes which are chemically stable over long periods are dyes which, when dissolved in the waterviscosity increaser, do not visibly precipitate, form scum at the liquid-air interface, or form agglomerates, or globules or the like, when the solution is viewed through a microscope of up to 30 power.

As used herein, highly soluble means that the concentration of dye which will dissolve in both the water and viscosity increaser is at least 5 times greater than the amount of dye to be used in the ink composition. Thus, upon evaporation of the water at the ink jet orifice, particularly during shutdown periods, such as overnight, the dye dissolved in the water-viscosity increaser will remain in solution rather than precipitate out of solution and clog the jet orifice. Moreover, in the event that any of the dye does precipitate and thus encrust the jet tip, it will readily redissolve in the ink composition when contacted with the ink. Thus, the ink composition is self-cleaning. The use of pigments or other forms of particulate matter as a coloring material should be avoided since the particles of this type of material would tend to clog the orifice of the jet printer.

While the exact chemistry of the dye in the water-viscosity increaser mixture is not known, it is believed that the high solubility of the dye therein is a significant factor in controlling tip-dry in and encrustation of the ject orifice. The concentration of the dye in the ink composition should be maintained well below its saturation point in the water-viscosity increaser mixture as this also contributes to controlling the encrustation in the jet orifice.

Dyes suitable for use in the present invention include highly sulfonated water soluble nigrosine dye, monoazo type dues, triphenylmethane type dyes, 1:1 premetallized monoazo chromium dye, pyrazolone dyes, disazo dyes and combinations thereof. The preferred dyes are triphenylmethane type dyes having color Index No. 42090 (Warner-Jenkenson FD & C Blue #1 dye) and color Index No. 42640 (Ciba-Geigy Eriosin 3B or Keystone Aniline & Chemical Co. Acid Violet 4BNP), a combination triphenylmethane and monoazo dye (Pylam Corporation, Pylam Green Concentrate #123781), a pyrazolone dye having Color Index No. 19140 (Warner-Jenkenson FD & C Yellow #5), a 1:1 premetallized monoazo chronium dye having Color Index No. 15711 (Ciba-Geigy Neolan Black WA Acid Black #52), a combination of two monoazo dyes (Pylan Corporation, Pylam Ink Red #110,782), a disazo dye having Color Index No. 24070 (cyanamid Calco Cid Blue Black FM Super Concentrate) and a highly sulfonated nigiosine dye having Color Index Acid Black #50420 (American Cyanamid Calco Nigrosine WSB Super Concentrated Crystals). The Color Index Numbers referred to are the color indexes listed in *Color Index*, 3d.ed., American Association of Textile Chemists and Colorists (1971) which is incorporated herein by reference.

The coloring material in the ink composition should be present in an amount sufficient to provide a printed image having the desired color intensity. For this purpose, dye in an amount of from about 1 to about 5 parts by weight preferably 2-3 parts and most preferably about 2 parts should be present in the ink composition.

The pH of the ink composition is adjusted, as necessary, by the addition of suitable acid or a suitable buffering agent (by suitable is meant one which does not adversely affect the properties of the desired ink composition). It has been observed that by maintaining the pH of the ink composition in the range of 3 to 6, preferably 4–5, the rate of encrustation of the jet orifice is reduced. At pH's of 3 to 6, encrustation in the jet orifice due to the precipitation of ion impurities in the water is minimized. For this purpose, sufficient amounts of an acid such as sulfuric acid, hydrochloric acid, acetic acid, nitric acid or any other acid or buffering agent compatible with the system of the present invention and which will not contribute to encrustation or mineral deposits, should be added to lower the pH of the composition to between 3 and 6, inclusive, preferably 4 to 5 inclusive. It should be noted that there is some doubt as to whether true pH is being measured in a system containing up to 97 parts by weight of a polar organic solvent such as propylene glycol or ethylene glycol. Thus for the purpose of this specification and the claims appended hereto the term pH refers to the "pH" read on the scale of an Orion Research Analog pH meter Model #301 having an internal silver-silver chloride combination electrode filled with a solution comprised of 2.0 molar potassium chloride which has been saturated with silver chloride and wherein the electrode has been standardized with a buffer solution to a pH of 7.03±0.01 at 25° C.

Preferably, a minor amount of preservative is added to the ink composition to inhibit the growth of bacteria during storage over prolonged periods. Without the preservative any bacteria growth in the ink could serve to clog the jet orifice of the printer. Various preservatives are known and are useful for this purpose. The preferred preservative, however, is GIV-GARD DXN, a brand of dimethoxane manufactured by Givaudan Corporation. Its chemical name is 6-acetoxy-2, 4 dimethyl-m-dioxane. This preservative is a clear yellow to light amber liquid having a specific gravity at 25°/25° C. of 1.060–1.075, a refractive index at 20° C. of 1.429–1.435, and a boiling point of 66° C.–68° C. at 3 mmHg. It does not freeze at −25° C. and it is soluble or miscible with water and organic solvents. For the purpose of this invention the amount of preservative added, when a preservative is used, will be from about 0.1 to about 0.4 parts by weight, preferably from about 0.15 to about 0.3 parts by weight.

The ink compositions described herein are preferably prepared by thoroughly mixing the components in the order described above, at ambient conditions. When the ink is made at ambient conditions the ink will self clean, that is, if the ink does dry in the jet tip, any encrustation will redissolve when the jet is simply flushed with fresh ink at ambient conditions. Also there will be a lower concentration of dye in the ink so that as the water evaporates, the dye dissolved therein will remain in solution longer, and thereby reduce the tendency for jet orifice encrustation. Filtration of the mixture after formation is highly desirable in order to remove from the ink composition any particulate matter which could clog the jet orifice of the jet printer. The filter should be no greater than 10 microns with 1 micron or less being preferred.

The following examples are illustrative of the present invention and are not intended as a limitation upon the scope thereof. As indicated above, all parts and percentages are based on the weight of the total ink composition unless otherwise noted.

While the invention is susceptible of various modifications and alternative forms, specific embodiments thereof will hereinafter be described in detail. It should be understood that it is not intended to limit the invention to the particular forms disclosed, but, on the contrary, the intention is to cover all modifications, equivalents and alternatives falling within the spirit and scope of the invention as expressed in the appended claims.

EXAMPLE 1

This Example illustrates the method used to form a violet colored ink composition in accordance with the present invention and utilizing the method of the present invention.

Into a mixing vessel 298 grams of ethylene glycol were charged. Ten and one-half (10.5) grams of Western Eaton Violet 3B 16901 were added to the ethylene glycol and mixed for 45 minutes to form a solution. The solution was then filtered for one hour over a 10 mm Hg vacuum using a Buchner funnel and a double layer of filter paper, #541 over #50. After filtration was complete, additional ethylene glycol was added to the filtrate to replace the ethylene glycol lost during filtration, and make the mass of the filtrate equal to the mass of the starting ethylene glycol-dye mixture. Forty-two (42) grams of distilled water were added to the filtrate and the mixture was stirred for 30 minutes to achieve a homogeneous solution. Activated charcoal, 20–40 mesh (10% by weight of the solution) was added, and the solution was stirred for about one hour. The solution was then filtered through a #541 over #50 filter at ambient conditions. The ink composition was then passed through a 1μ filter to remove any residues or particulates in solution. The ink was not pH adjusted because the pH of the composition was within the desired range of 3 to 6, vis, the pH of the composition was 4.4.

The resulting ink composition in accordance with the invention consisted of:
Ethylene glycol—85.0
water—12.0
dye—3.0
The viscosity of the ink composition was 12.1 cps at 24° C. and the surface tension was 54.2 dynes/cm at 24° C.

EXAMPLE 2

Using the general procedure as described in Example 1, the following ink composition, having a viscosity of about 11 cps at 25° C. was prepared:
Ethylene Glycol—83.3
Deionized Water—13.2
Cyanamid Calco-Nigrosine WSB—2.0
DXN Stock Sol'n (10% DXN in $H_2O$)—1.5
Further, the pH of the composition was adjusted to pH of about 5 by the addition of concentrated hydrochloric acid to the composition.

EXAMPLE 3

Using the general procedure as described in Example 1, the following ink composition having a viscosity of about 7 cps at 25° C., was prepared:
Ethylene Glycol—68.5
Deionized Water—28.0
Cyanamid Calco-Nigrosine WSB—2.0
DXN Stock Sol'n (10% DXN in $H_2S$)—1.5
The compositions of Examples 1 and 2 were tested for shelf life and in an ink jet printer are found to be stable over an extended period of time, and to minimize gassing and jet tip encrustation.

EXAMPLE 4

Using the general procedure described in Example 1 the following ink composition was prepared:
Propylene Glycol—53.0
Deionized Water—45.0
Cyanamid Calco-Nigrosine WSB Super Concentrated Crystals—2.0
Concentrated hydrochloric acid may be added to adjust the pH, and a preservative may be added to inhibit fungus and bacteria growth.

EXAMPLE 5

Another violet ink composition was made using the general procedure as described in Example 1. The composition had a viscosity of 11.1 cps at 24° C., a surface tension of 54.4 dynes/cm at 24° C. and pH 4.6. The composition comprised:
Ethylene glycol—85.0
Distilled Water—12.0
Keystone Acid Violet 4BNP—3.0
No acid was added to the composition. A preservative may be added to inhibit fungus and bacteria growth.

EXAMPLE 6

Using the general procedure described in Example 1, the following ink composition was prepared:
Ethylene glycol—82.5
Distilled water—11.5

Pylam Green #123781—6.0

The composition had a viscosity of 14 cps at 24° C.; a surface tension of 54.6 dynes/cm at 24° C.; and pH 5.3. No acid was added to the composition. A preservative may be added to inhibit fungus and bacteria growth.

EXAMPLE 7

An ink composition having a viscosity of 12.0 cps at 23° C., a surface tension of 43.5 dynes/cm at 23° C. and pH 7.1 (adjusted to 5.4 by the addition of acetic acid) was prepared according to the general procedure as described in Example 1. The composition included:
Ethylene glycol—85.0
Distilled water—12.0
Pylam Ink Red #110782—3.0

EXAMPLE 8

Using the general procedure as described in Example 1, the following ink composition was prepared:
Ethylene glycol—87.9
Distilled Water—7.96
Neolan Black WA #16904—4.13

The ink composition had a viscosity of 14.3 at 25° C., a surface tension of 53.8 dynes/cm at 25° C. and pH 7.7. An acid may be added to this composition to lower pH, and a preservative may be added to this composition to inhibit fungus and bacteria growth.

EXAMPLE 9

The ink compositions of Examples 2, 5, 6, 7 and 8 were used in an ink jet printer for printing on chart paper and were found to be suitable in accordance with the objectives of the present invention. Several of the ink compositions did encrust the jet tip, but they were easily flushed, that is, the ink was selfcleaning, as set forth herein.

It is apparent from the foregoing that the present invention provides a new and useful ink composition for use in jet print processes which eliminates tip-dry, is chemically stable over prolonged periods and minimizes ink gassing in the ink supply line.

It will be understood that various changes and modifications can be made in the details of the procedure, formulation and use without departing from the sprit of the invention.

I claim:

1. An ink composition comprising (based on 100 parts by weight of the total ink composition) from about 2 to about 80 parts water, from about 20 to about 97 parts of a lower alkylene glycol selected from the group consisting of ethylene glycol and propylene glycol, from about 1 to about 7 parts of a coloring material which is highly soluble in both water and the lower alkylene glycol and has high tinctorial power and is resistant to fading by light, is chemically stable for long periods in both water and the viscosity increaser, said ink composition further characterized by its ability to reduce the evolution of gases at reduced pressure and an adjusted pH in the range of from 3 to 6, inclusive.

2. The ink composition of claim 1 wherein said composition further comprises from about 0.1 to about 0.4 parts preservative.

3. The ink composition of claim 1 wherein the lower alkylene glycol is propylene glycol.

4. The ink composition of claim 1 wherein the lower alkylene glycol is ethylene glycol.

5. The ink composition of claim 1 wherein the pH of said composition is adjusted by the addition of an acid selected from the group consisting of hydrochloric acid, sulfuric acid, nitric acid and acetic acid.

6. The ink composition of claim 1 wherein said composition has a viscosity of 2 to 20 centipoise at 25° C. and a surface tension of 25 to 55 dynes/cm at 25° C.

7. The ink composition of claim 1 wherein said coloring material is selected from the group consisting of highly sulfonated water soluble nigrosine dye, monoazo dye, triphenylmethane dye, 1:1 premetallized monoazo chromium dye, pyrazoline dye, disazo dye and combinations thereof.

8. The ink composition of claim 1 wherein said coloring material is a triphenylmethane dye having Color Index No. 42090.

9. The ink composition of claim 1 wherein said coloring material is a triphenylmethane dye having Color Index No. 42640.

10. The ink composition of claim 1 wherein said coloring material is a pyrazoline dye having Color Index No. 19140.

11. The ink composition of claim 1 wherein said coloring material is 1:1 premetallized monoazo chromium dye having Color Index No. 15711.

12. The ink composition of claim 1 wherein said coloring material is a disazo dye having Color Index No. 20470.

13. The ink composition of claim 1 wherein said coloring material is a highly sulfonated nigrosine dye having Color Index Acid Black 2, No. 50420.

14. The ink composition of claim 1 comprising a mixture of 83.3 parts ethylene glycol, 13.2 parts deionized water, 2.0 parts highly sulfonated water soluble base nigrosine dye having Color Index Acid Black 2, number 50420, 1.5 parts of a 10% solution of 6-acetoxy-2,4dimethyl-m-dioxane in water and sufficient concentrated HCl to give a measured pH of from 4 to 5, said composition having a viscosity of 11 cps at 25° C., a surface tension of approximately 45 dynes/cm and a density of 1.1 g./cm$^3$.

15. The ink composition of claim 1 comprising a mixture of 85.0 parts ethylene glycol, 12.0 parts distilled water and 3.0 parts of a triphenylmethane dye having Color Index No. 42460, said composition having a viscosity of 12.1 cps at 24° C., a surface tension of about 54.2 dynes/cm at 24° C. and a measured pH in the range of from 4 to 5.

16. The ink composition of claim 1 comprising a mixture of 87.9 parts ethylene glycol, 7.96 parts distilled water and 4.13 parts of a 1:1 premetallized monoazo chromium dye having Color Index 15711, and sufficient acetic acid to give a measured pH of from 4 to 5, said composition having a viscosity of 14.3 at 25° C. and a surface tension of about 53.8 dynes/cm at 25° C.

17. A method of preparing an ink composition comprising:
(a) mixing to form a homogeneous solution from about 20 to about 97 parts of a lower alkylene glycol selected from the group consisting of propylene glycol and ethylene glycol, with from about 1 to about 5 parts coloring material which is highly soluble in both water and the lower alkylene glycol, is chemically stable over long periods in water and the lower alkylene glycol, and has the ability to reduce the evolution of gases from the solution at reduced pressure;
(b) filtering the solution of (a) over a vacuum to remove undissolved residues from the solution;

(c) adding to the solution of (b) sufficient lower alkylene glycol to replace the lower alkylene glycol lost during filtration,
(d) adding distilled water to the solution of (c) and stirring the mixture for a period sufficient to obtain a homogeneous solution;
(e) adding to the solution of (d) activated charcoal to form a mixture;
(f) stirring the mixture of (e) to remove from the solution impurities in reactive components of the coloring material;
(g) filtering the mixture of (e) to remove the activated charcoal.

18. The method of claim 17 wherein the pH of the filtered ink composition of step (g) is adjusted to a value in the range of from 3 to 6 inclusive.

* * * * *

UNITED STATES PATENT AND TRADEMARK OFFICE
CERTIFICATE OF CORRECTION

PATENT NO. : 4,239,543
DATED : December 16, 1980
INVENTOR(S) : J. Donald Beasley It is certified that error appears in the above-identified patent and that said Letters Patent are hereby corrected as shown below:

Column 2, line 6, between "ink" and "printer", please insert the word --jet--.

Column 4, line 18, before "enhance", please insert the word --to--.

Column 5, line 1, "ject" should be --jet--.

Column 5, line 43, "waterviscosity" should be --water viscosity--.

Column 5, line 68, "ject" should be --jet--.

Column 9, line 44, "sprit" should be --spirit--.

Signed and Sealed this

Tenth Day of March 1981

[SEAL]

*Attest:*

RENE D. TEGTMEYER

*Attesting Officer*  *Acting Commissioner of Patents and Trademarks*